United States Patent [19]

Ghose

[11] Patent Number: 5,047,736

[45] Date of Patent: Sep. 10, 1991

[54] SELECTIVE INTERFERENCE REDUCTION IN TRANSMISSION LINES

[75] Inventor: Rabindra N. Ghose, Los Angeles, Calif.

[73] Assignee: Technology Research International, Inc., Calabasas, Calif.

[21] Appl. No.: 580,146

[22] Filed: Sep. 10, 1990

[51] Int. Cl.[5] .................. H04B 7/28; H03B 29/00
[52] U.S. Cl. .................................. 333/12; 333/17.1; 381/71
[58] Field of Search .................. 333/12, 17.1; 381/71; 455/63, 304–306; 181/206

[56] References Cited

U.S. PATENT DOCUMENTS 4,128,848 12/1978 Nakagawa ............... 455/305 X
4,473,906 9/1984 Warnaka et al. ................ 381/71

Primary Examiner—Paul Gensler
Attorney, Agent, or Firm—Rabindra N. Ghose

[57] ABSTRACT

Devices and methods for selectively reducing an electromagnetic or acoustic interference present in a transmission line by an active adaptive means, are described. For the electromagnetic interference, the transmission line may include a waveguide carrying a desired signal along with an undesired interference, the objective of the invention being to reduce the interference selectively at the output of the transmission line without affecting the desired signal substantially. Similarly, for an acoustic interference, the transmission line may include an exhaust pipe of an auto or Diesel engine carrying an undesired acoustic interference or noise, the objective of the invention being to reduce this noise at the output of the pipe. The selective interference reduction in this invention is achieved by sampling the interference almost exclusively from the transmission line, and automatically synthesizing a cancelling interference which, when summed with the interference present in the transmission line, cancels or substantially reduces the interference at the transmission line output. A closed-loop control is used to reverse the polarity and to adjust the amplitude and phase of the cancelling interference until the sum of the synthesized cancelling interference, and that to be reduced in the transmission line, becomes a minimum.

12 Claims, 4 Drawing Sheets

SELECTIVE INTERFERENCE REDUCTION IN TRANSMISSION LINES

BACKGROUND OF THE INVENTION

1. Field of Invention

This invention is in the broad field of signal processing and, in particular, is in the field of interference reduction in a transmission line, or its equivalent, carrying an unwanted signal or interference.

2. Related Art

Frequency domain filters that discriminate against undesired signals constitute one related prior art for this invention, since when the unwanted signals occupy frequency bands different from that of the desired signal, the unwanted signals can filtered out of the transmission line. If however the desired signal and interferences occupy an overlapping frequency band, conventional filters discriminating on the basis of signal frequencies, are of little value. Also, when the power levels of the signal or the interference or both are very high, the design of a filter becomes a difficult task since even a slight mistuning of the tuned circuits in the filters may burn out such filters. The present invention relates to methods and apparatus that avoid the short comings of the frequency domain filters by providing an adaptive cancellation of the interference regardless of its spectral characteristics and power levels. Further distinction between the present invention and related prior art will be apparent from the specification, drawings, and claims of this invention.

The inventions of Chaplin[1], Swinbanks[2], Ghose and Sauter[3] and Ghose[4] should be considered as relevant references in connection with the present invention since they all address interference reduction. The difference between the present invention and each of these references are discussed below.

In many modern radars, the modulated, transmitting signal is often amplified to its full power level before it is fed to the antenna through the transmit-receive switch, or its equivalent for subsequent radiation. For such cases even a slight nonlinearity in the amplifier could generate intermodulation signal products having frequencies different from those of the desired transmitting signal, particularly for the high power level of the amplifier. These intermodulation products can be sources of interferences in neighboring communication and radar receivers, when such receivers are intended to receive very weak signals. When the radar waveform is complex, the intermodulation frequency spectrum extends far beyond that of the transmitting signal spectrum for the radar, and even when the power level of the interference is much below that of the transmitting signal, the interference effect is not tolerable in many circumstances.

When the interference and the desired transmitting signal spectra are not overlapping, a frequency domain allowing the desired signal to pass but restricting the interference, should theoretically remedy the interference reduction problem. However, such a filter has to be designed for the high power level of the transmitting signal. High power filters are expensive and often not reliable since even a slight mistuning of the filter circuit may burn such a filter. An alternative to this high power filter is a means which subtracts selectively the interference from the transmission line or waveguide feeding the antenna, leaving the desired transmitting signal at the output of the transmission line or waveguide and hence at the antenna. Since the power level of the interference is usually much lower than that of the transmitted signal, no high power filter will be needed in that case. One objective of the invention is to offer an adaptive alternative means to filter out an interference selectively from a high power transmission line or waveguide without using high power filter circuits. Such an alternative effects the interference reduction by selectively cancelling the interference by synthesizing an interference which is equal in amplitude but 180 degrees out-of-phase with respect to the interference to be cancelled. In this invention, the cancelling interference is synthesized from a sample of the interference at one point of the transmission line or waveguide, by reversing its polarity and adjusting its amplitude and time delay or phase until the adjusted interference becomes equal in amplitude and 180 degrees out-of-phase with respect to the interference remaining at the transmission line or waveguide at the coupling point where the cancelling interference is injected into the line or waveguide. The synthesis in the invention is effected by a closed-loop control discussed further in the text.

The concept of interference reduction from a transmission line or waveguide can be extended to the acoustic interference or noise reduction in an exhaust pipe of an auto or Diesel engine. At present noise mufflers are used at the exhaust pipe to reduce the intensity of acoustic interference generated in auto and Diesel engines. While reducing the acoustic noise, however, the muffler creates a back-pressure at the exhaust pipe which in turn leads to a reduction of engine efficiency, and more importantly, to an increased amount of unburned hydrocarbons. Many concerned people believe that an alternative means of noise reduction that can reduce unburned hydrocarbons in exhaust and increase engine efficiency, thus requiring even less fuel, may be highly desirable. Providing such an alternative is another objective of this invention. In this case the exhaust pipe is a transmission line for the acoustic interference or noise and the noise reduction principle involves, as noted earlier, sampling of the interference from a sampling point of the exhaust pipe, reversing its polarity and adjusting its amplitude and phase until the adjusted interference becomes equal in amplitude and 180 degrees out-of-phase of the same interference at a coupling point of the exhaust pipe, ahead of the sampling point where the adjusted interference is injected into the pipe. The sampling, in this case, is effected by a microphone which converts the acoustic interference into an electric signal while the injection of the adjusted interference is effected by a transducer which converts the electric signal back to the corresponding acoustic interference. Again, the synthesis of the cancelling signal is effected by a closed-loop control.

With reference to the prior art, the inventions of Chaplin[1], Swinbanks[2], Ghose and Sauter[3], and Ghose[4] should be considered as relevant since they all address the reduction of interference or noise by synthesizing a cancelling interference by various means. The similarity between any one of these inventions with the present invention, however, virtually ends there. For example, the Chaplin invention teaches us how to minimize repetitive vibration, presumably in a solid structure where the vibration is set up by a machine. Repetitive vibration characterizes back and forth motion in an elastic medium that is repeated at regular intervals of time. This implies, primarily, the presence of a single frequency as is assumed in the Chaplin invention when the "synchronizing" signal is obtained by a phased-lock loop. The phased-lock loop is capable of locking the phase of one signal with respect to another and, since the term "phase" is meaningless for a multifrequency incoherent noise or interference, the teaching of the Chaplin invention is confined to means of reducing primarily a single frequency vibration. Furthermore, the vibration in solids or in an elastic medium depends not only on the characteristics of the source that stimulates the vibration, but also on the material characteristics of the medium undergoing vibration, its shape and geometry such as solid bars, strings, membranes, solid structures, etc. Perhaps, the most fundamental difference between this invention and the Chaplin invention is that the former addresses the problem of reduction of simultaneously present multifrequency acoustics or electromagnetic interference or noise when the phases corresponding to these frequencies are incoherent and random, and change with time, while the Chaplin invention addresses a single frequency interference or noise.

Next, the Swinbank invention teaches us how to minimize acoustic interference or noise in a pipe, where unlike the Chaplin invention, the interference could contain multiple frequencies simultaneously. In Swinbank's invention, the transfer function of the signal processing system synthesizing the cancelling interference is varied in an iterative manner using a complex data processing and memory. Such a control to synthesize a cancelling interference is quasi closed-loop control at best, and the degree of cancellation becomes limited, particularly when a rapid change of transfer function is needed. In contrast, the equivalent transfer function in the present invention involves an amplitude gain or loss and a change in time delay or phase requiring no memory or complex data processing. Also, the control in this invention is truly a closed-loop control where the criterion of driving the error signal to zero is the same as the desired objective of interference reduction.

Similarly, unlike the present invention, the Ghose and Sauter invention relates to a radio communication system and is useful for minimizing or eliminating an interference in a radio receiver. Although there are some similarities between the present invention and that of Ghose and Sauter, the former invention addresses the problem of interference reduction where the desired signal is more powerful than the interference in the line to be protected while the Ghose and Sauter invention addresses the problem of interference reduction in a line where the interference is more powerful than the desired signal, particularly insofar as the electromagnetic interference is concerned. Also, unlike the present invention, the Ghose and Sauter invention cannot cure an acoustic interference problem, and unlike the Ghose and Sauter invention the desired signal is not necessary for the effective removal of the acoustic interference in the present invention.

Finally, the Ghose invention, unlike the present invention, addresses the problem of interference reduction over a broad region. It is more like a phased array where the amplitude and phase of different elements of the array are varied to create a null in a specific direction. Radiating sources of interference are vital elements of the Ghose invention. No such elements are involved in the present invention. The Ghose invention and the present invention are, therefore, two different inventions having different objectives, relevant elements and claims.

Other differences between the relevant prior arts and the present invention will be apparent from the specifications, drawings and claims that follow.

| REFERENCES U.S. PATENT DOCUMENTS | | |
| --- | --- | --- |
| (1) 4,566,118 | 01/1986 CHAPLIN | 381/71 |
| (2) 4,596,033 | 06/1989 SWINBANKS | 381/71 |
| (3) 3,699,444 | 10/1972 GHOSE AND SAUTER | |
| (4) 4,829,590 | 05/1989 GHOSE | |

SUMMARY OF THE INVENTION

The inventive apparatus described here is comprised primarily of a main transmission line carrying an interference, or a combination of an interference and a desired signal and a branch transmission line, where the desired signal, if any, is selectively suppressed and the polarity of the interference is reversed, with respect to that which is present at the main transmission line. The interference at the branch transmission line is also adjusted in amplitude and in time-delay such that at a common summing point, where the two transmission lines meet the summed interference is cancelled, the interference in one line being equal and opposite of that at the other line. When the transfer characteristics, that is the attenuation and time delay, of the main and branch transmission lines are not the same, the interference is not cancelled at the common summing point referred to above. In the invention apparatus, the residual interference, following the summation, is used as an error signal for the closed-loop control which continuously adjusts the transfer characteristics of the branch transmission line until the error signal is driven to a null. The criteria, for the zero error signal and the cancellation of the interference at any point of the extension of the main transmission line beyond the common summing point are identically the same. Also, since the equilibrium condition of the closed-loop control is obtained when the error signal is zero, the closed-loop serves as a tracking loop that not only cancels the interference at one time, but also maintains the cancellation of interference even when the transfer characteristics of any or both transmission lines change with time. Furthermore, since the equality of the time delay for the interference in two transmission lines is maintained continuously, a broadband interference cancellation is feasible in the inventive apparatus, the time delay being independent of the frequency spectrum of the interference.

When it is desired that the interference be cancelled at any point of the extended main transmission line beyond the common summing point of the two lines without affecting the desired signal, it is necessary to selectively suppress the desired signal at the branch transmission line. Such a suppression is effected in the inventive apparatus by a that passes the interference only, without appreciable attenuation, but not the desired signal, particularly when the desired signal and the interference occupy different frequency spectra. When the frequency spectra of the desired signal and the interference are similar and overlapping, a selective suppression of the desired signal is effected by cancelling the desired signal at the branch transmission line, using a sample of the desired signal and a closed-loop control similar to the one described above.

In the inventive apparatus, the adjustments of the branch transmission line transfer characteristics, comprised of the time delay or phase change and the signal through line gain or attenuation, are effected by a signal controller, controlled by the error signal mentioned earlier. Commercial component limitations often make the design and implementation of a signal controller over a very wide frequency band difficult. This problem is avoided in one embodiment of the inventive apparatus by first up-converting the interference to higher frequencies by mixing it with a higher frequency continuous-wave signal from a local oscillator, and then carrying out the signal controller functions, that is changing the amplitude and time delay of the interference at higher frequencies. The percentage bandwidth of the up-converted interference spectrum with respect to the center frequency of the spectrum is much less than that of the original interference, simplifying the signal controller design. Following the adjustments of amplitude and time delay or phase change, the interference at the branch line is down-converted with the same continuous-wave signal from the local oscillator mentioned above as the reference, before summing this interference with that at the main transmission line at the common summing point. By this approach, then, a wide frequency band of the original interference becomes a much narrower band relative to the center frequency of the up-converted interference and, hence, the problem resulting from the components limitation is avoided.

One advantage of the inventive apparatus is to effect an adaptive filtering of an arbitrary interference present at a transmission line when the characteristics of the interference, including its amplitude and frequency spectrum, are not a priori known. Another advantage of the inventive apparatus is to effect a cancellation of an interference at a transmission line, regardless of the relative ratio of the interference to desired signal amplitudes.

Another advantage of the inventive apparatus is to effect a very wide band interference or noise cancellation as is needed in an exhaust pipe of a gasoline or Diesel engine.

Further objects and advantages of the inventive apparatus will become apparent from the study of the following portion of the specifications, the claims and the attached drawings.

DESCRIPTION OF THE PREFERRED EMBODIMENTS

Figure 1:
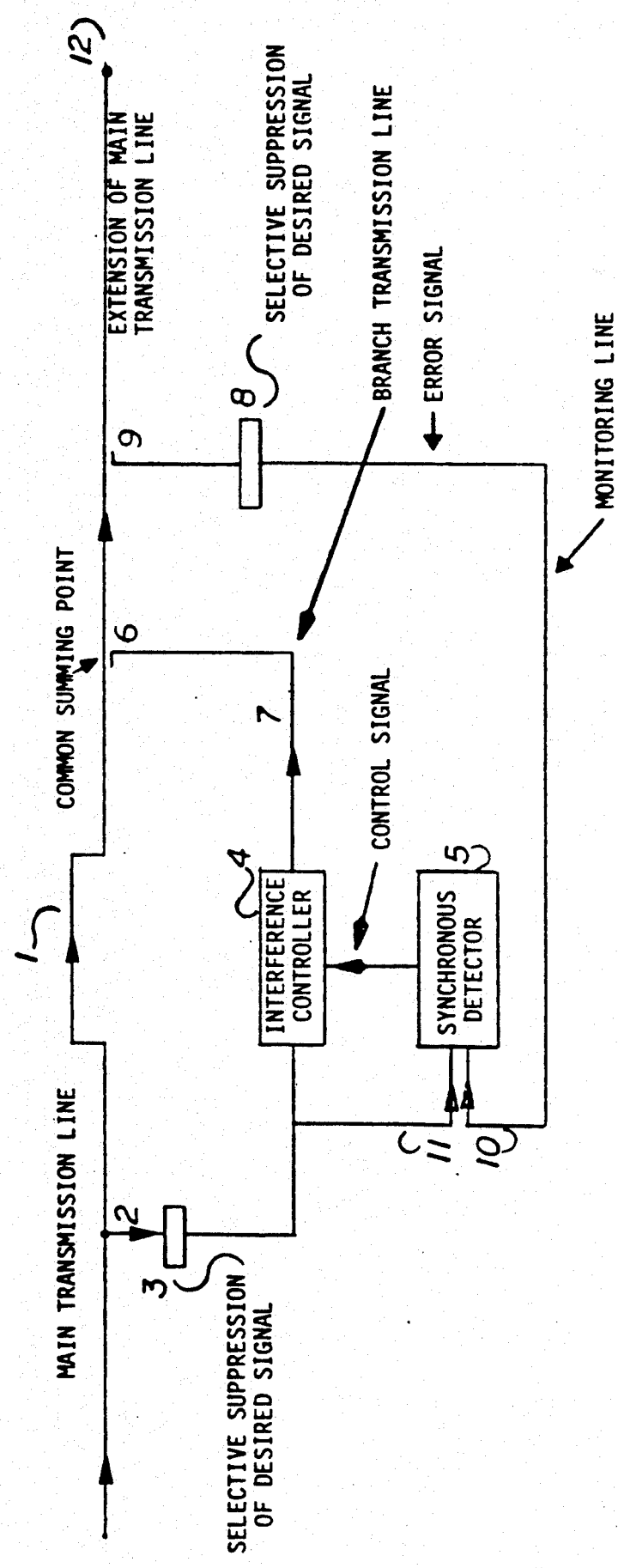
FIG. 1 is a simplified schematic arrangement for the selective interference reduction in a transmission line comprised of the transmission line, a branch transmission line, and a closed-loop and polarity reversal of the interference at the branch transmission.

FIG. 1 is a simplified schematic arrangement for the reduction of an arbitrary interference at the output 12 of the main transmission line 1. Here a sample of the interference to reduced is channeled from the mainline into the branch transmission line 7 at the sampling point 2, through the selective suppressor of the desired signal 3 and an interference controller 4 that can reverse the polarity and change the amplitude and time delay of the interference flowing therethrough, in the branch line. This branch line interference is summed with the interference at the main transmission line at the common summing point 6 of the main and branch transmission lines. A sample of the summed interference is coupled into the monitoring line, through a monitoring coupler 9. The desired signal, if any, is also suppressed at the monitoring line by the selective desired signal suppression arrangement 8, which is similar to 3. As noted before, the interference controller 4 changes the amplitude and time delay of the interference at the branch line, in accordance with the control signal derived from the output of the synchronous detector 5. The essential characteristic of the synchronous detector is such that, as long as there is any interference at the monitoring line, and hence at the input port 10 of the synchronous detector having the same waveform as the interference at the reference port 11 of this detector, there will be direct current control signal, capable of changing the amplitude and time delay of the interference flowing through the interference controller.

The basic concept of interference reduction by the arrangement shown in FIG. 1 is that the same interference flowing through the main and branch transmission lines experiences identical amplitude and time delay changes, and, hence, they cancel each other at the common summing point 6, the interference in the branchline being equal and opposite to that at the mainline. When the interference amplitude and time delay at the two lines are not the same, there will be a residual interference following the summation at 6. This residual interference is monitored through the coupler 9 and is led to the synchronous detector input 10, as an error signal. Since the reference port 11 of the synchronous detector has the interference with a waveform identical to the interference at the main transmission line, any nonzero interference at the input port 10 will cause direct current control signals for the interference controller. These control signals will change the amplitude and time-delay of the interference at the branchline until the main and branchline interferences become equal and opposite to each other. For such a condition, there will be no error signal at the monitoring line causing the control loop to reach an equilibrium. Also, the zero error signal will imply that the cancellation of the interference at the mainline follows the common summing point 6, and hence at the output 12 of the main transmission line.

If there are both a desired signal and an interference at the main transmission line, the desired signal must be removed from the branchline, otherwise the desired signal will also be cancelled at the common summing point 6 and beyond, and at the output 12. When the frequency spectra of the desired signal and the interference are different the removal of the desired signal at the branchline is easily effected by a that passes the interference but severely attenuates the desired signal.

To explain the interference reduction by the inventive apparatus, let the desired signal and the interference at the main transmission line at the sampling point 2, be represented as S(t) and I(t) respectively, t being the time. Following the removal of the desired signal, the branchline interference may be denoted as $-K\,I(t+\tau)$ where K and $\tau$ are respectively an amplitude factor and a time delay that modifies I(t) at the branchline between the sampling point 2 and common summing point 6. The minus sign appears because the interference controller reverses the polarity or introduces an 180° phase shift in addition to effecting changes in amplitude and time delay of the interference flowing therethrough.

At the common summing point 6 the desired signal and the interference may be written as $$E = MS(t+T) + MI(t+T) - KI(t+\tau)$$

where M and T denote, respectively, the attenuation factor and time delay introduced by the main transmission line between the points 2 and 6.

When M→K and T→$\tau$, E→MS(t+T) representing the desired signal only, without the interference. The object of the closed-loop control of the inventive apparatus is to make K approach M, and $\tau$ approach T.

Thus, when M≠K and T≠$\tau$, there will be a residual interference at the monitoring coupler 9. Following the removal of the desired signal, by the desired signal suppressor 8, the synchronous reference port 10, then, will contain a nonzero interference of the same waveform as that of mainline 1. This nonzero interference at 10 will result in direct current control signals which will change the values of K and $\tau$ until M=K and $\tau$=T. Under this condition E→MS(t+T) and the interference at port 10 will be zero. If for some reason, such as temperature fluctuation, etc., M, T, or both change, K and $\tau$ will automatically adjust to new values of M and T, respectively, to create an interference null at the mainline output 12. Thus, the closed-loop control will serve as a tracking loop and will maintain an interference null at 12 for any time varying change in M and T.

Figure 2:
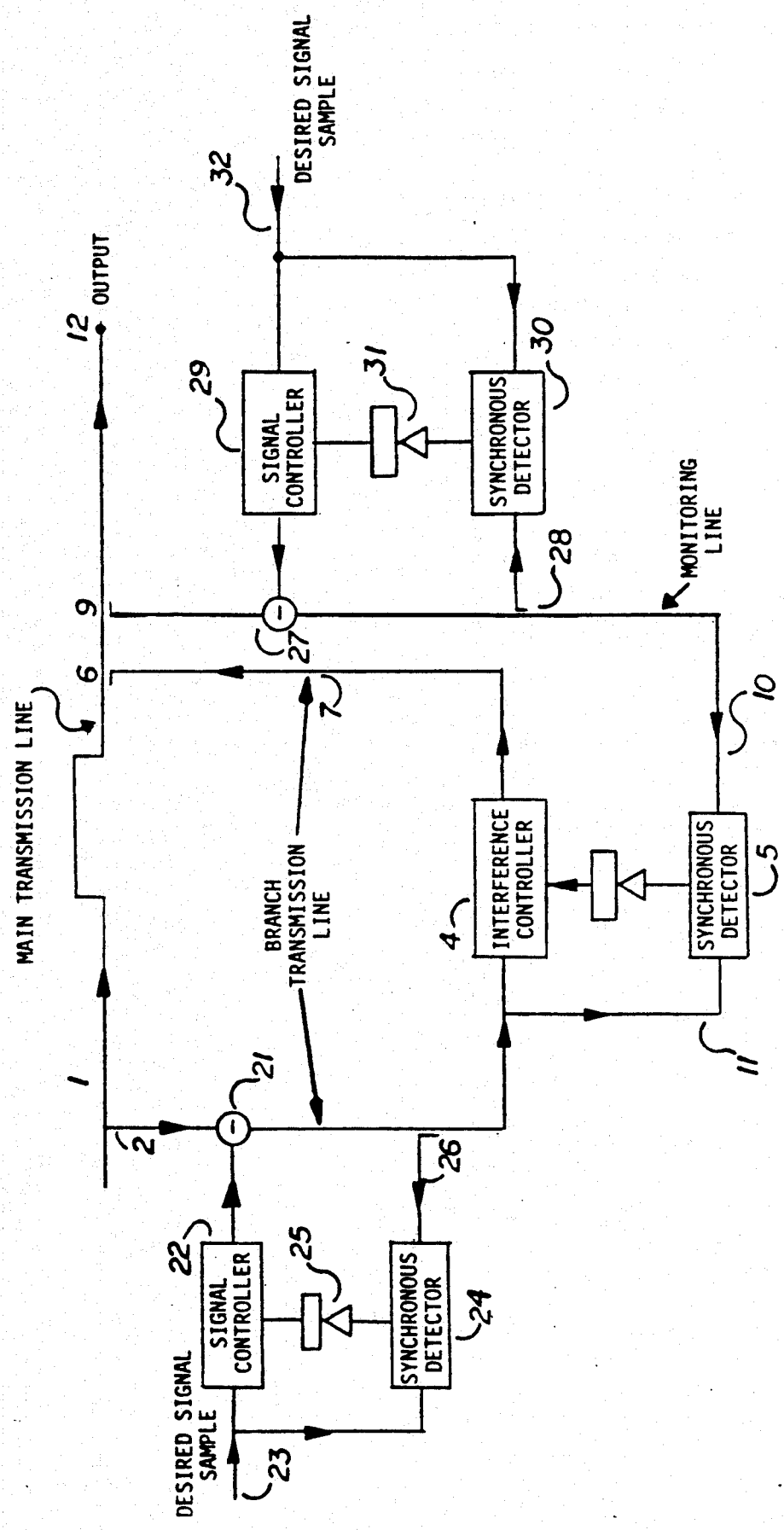
FIG. 2 is a more detailed block diagram of the selective interference reduction arrangement including its essential elements such as the closed-loop suppressing the desired signal at the branch line, and at the monitoring line, and the closed-loop control of the interference with an amplifier-integrator assembly located between the synchronous detector and the signal or interference controller.

FIG. 2 shows the same interference cancellation concept as in FIG. 1, except that two additional closed-loop controls are introduced to selectively remove the desired signal from the branch transmission line and the monitoring line. These two control loops serve the functions of blocks 3 and 8 in FIG. 1. To illustrate the operation of one of the loops that removes the desired signal from the branchline, let a sample of the desired signal be fed at the coupling point 23. This sample is led to a signal controller 22 which adjusts the amplitude and time delay of the sample, in addition to reversing the polarity of the signal. Thus, if the sample of the desired signal is $S_1(t)$, it differs, in most cases, from S(t) only by an amplitude factor $K_1$ and time delay $\tau_1$. If $\tau_1$ is negative, an additional line can be attached to the mainline before the sampling point 2. Thus, the desired signal S(t) at the sampling point 2 of the branch transmission line can be written as $$K_1 S_1(t+\tau_1).$$

The signal controller 22, in this case, introduces the amplitude gain factor $K_1$ and time delay $\tau_1$ so that S(t) at the summing point 21 is cancelled. Again, if the desired signal is not cancelled at 21 because of the incorrect setting of the signal control parameters $K_1$ and $\tau_1$, there will be a residual desired signal at coupler 26. The synchronous detector 24, referenced by the desired signal sample at 23, will generate control signals for the controller 22. An amplifier integrator circuit is introduced between the signal controller 22 and the synchronous detector 24 to enhance the loop gain, and to out non-direct current signals from the control signals. The net effect of the closed-loop control comprised of the signal controller 22, couplers 21 and 26, the synchronous detector 24, and the amplifier-integrator assembly 25, is to eliminate the desired signal S(t) from the branch transmission line and maintain such an elimination by continuously tracking the residual desired signal at 26.

A similar closed-loop control comprised of the signal controller 29, couplers 27 and 28, synchronous detector 30, and the amplifier integrator assembly 31, continuously eliminates the desired signal at the monitoring line 10 for the interference cancellation loop that includes the interference controller. An amplifier-integrator assembly is also introduced between the interference controller 4 and the synchronous detector 5 to serve the same function noted earlier for the interference cancellation loop.

Figure 3:
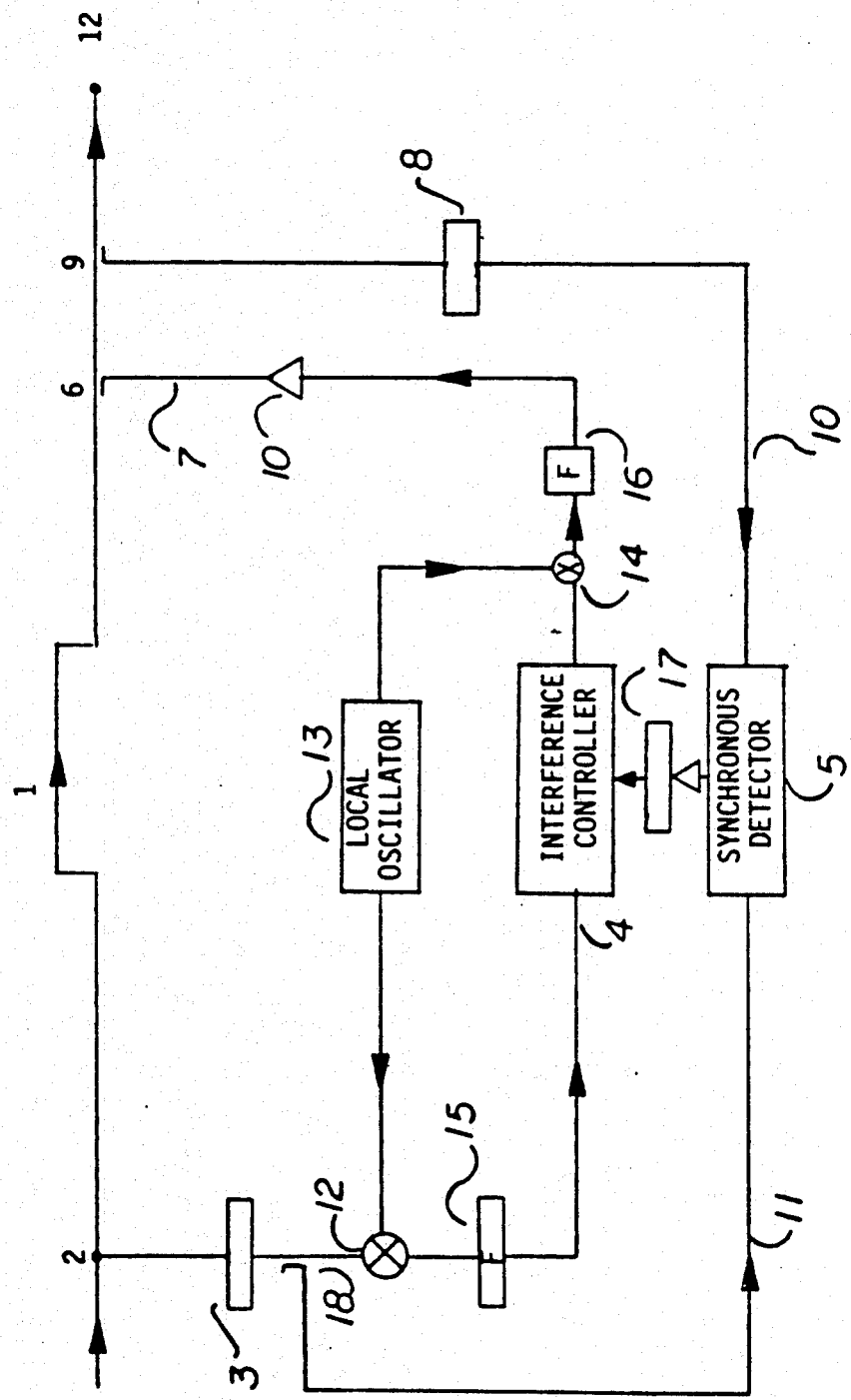
FIG. 3 is a block diagram of a broadband interference reduction arrangement for a transmission line where the interference at the branch line is up-converted at higher frequencies and then controlled in amplitude and in time or phase delay before down converting and summing this branch line interference with that at the main line, for cancellation.

FIG. 3 shows a schematic arrangement for another embodiment of the inventive apparatus, suitable for broadband interference reduction. As may be seen from FIG. 3, this arrangement is similar to the basic interference reduction scheme shown in FIG. 1 except the branchline interference, following the removal of the desired signal, if any, present at the main transmission line 1 at point 2, by block 3, is first up-converted in frequency by mixing the interference at the mixer 12 with a continuous wave signal from the local oscillator 13, at a frequency substantially higher than any frequency component of the interference, and then down converting the interference back to its original frequency spectrum following the interference controlling function at block 4. The object of the up and down conversion of the interference is to facilitate the interference controlling function accommodating a wide frequency band. Here filters 15 and 16, respectively, are used to pass the up converted and down-converted interference following the mixing.

An example of an interference controller is a combination of two linear electronic attenuators connected in quadrature, such that an input interference A sin(wt) appears at the output as $$-P_1 A \sin(wt) - P_2 A \sin(wt + \pi/2) =$$

$$-\sqrt{P_1^2 + P_2^2}\; A \sin(wt - \theta)$$

where $\theta$ = arc tan $(P_2/P_1)$, $-P_1$ and $-P_2$ being the two amplitude attenuation factors introduced by the two electronic attenuators. Such a controller adjusts the amplitude and phase of the input signal by a factor $\sqrt{P_1^2 + P_2^2}$ and arc tan ($P_2/P_1$) respectively. With such a controller one also needs to match the line lengths of the main and branch lines for a relatively broadband operation.

As the interference bandwidth increases covering, perhaps, several octaves, or even decades, it is often difficult to maintain the quadrature relationship noted above. However, when the interference is up-converted to a higher frequency spectrum, the relative bandwidth, defined as the ratio of the upper end to the lower end of the interference spectrum, becomes much less than the same ratio for the original interference. Once the interference controlling function is obtained, the controlled interference has to be down converted before summing it with the mainline interference at the point 6. It should noted that the control signals are generated by the synchronous detector 5 where the reference port 11 and the error port 10 have interferences at the original frequency spectrum of the interference and not the up-converted frequency spectrum.

Figure 4:
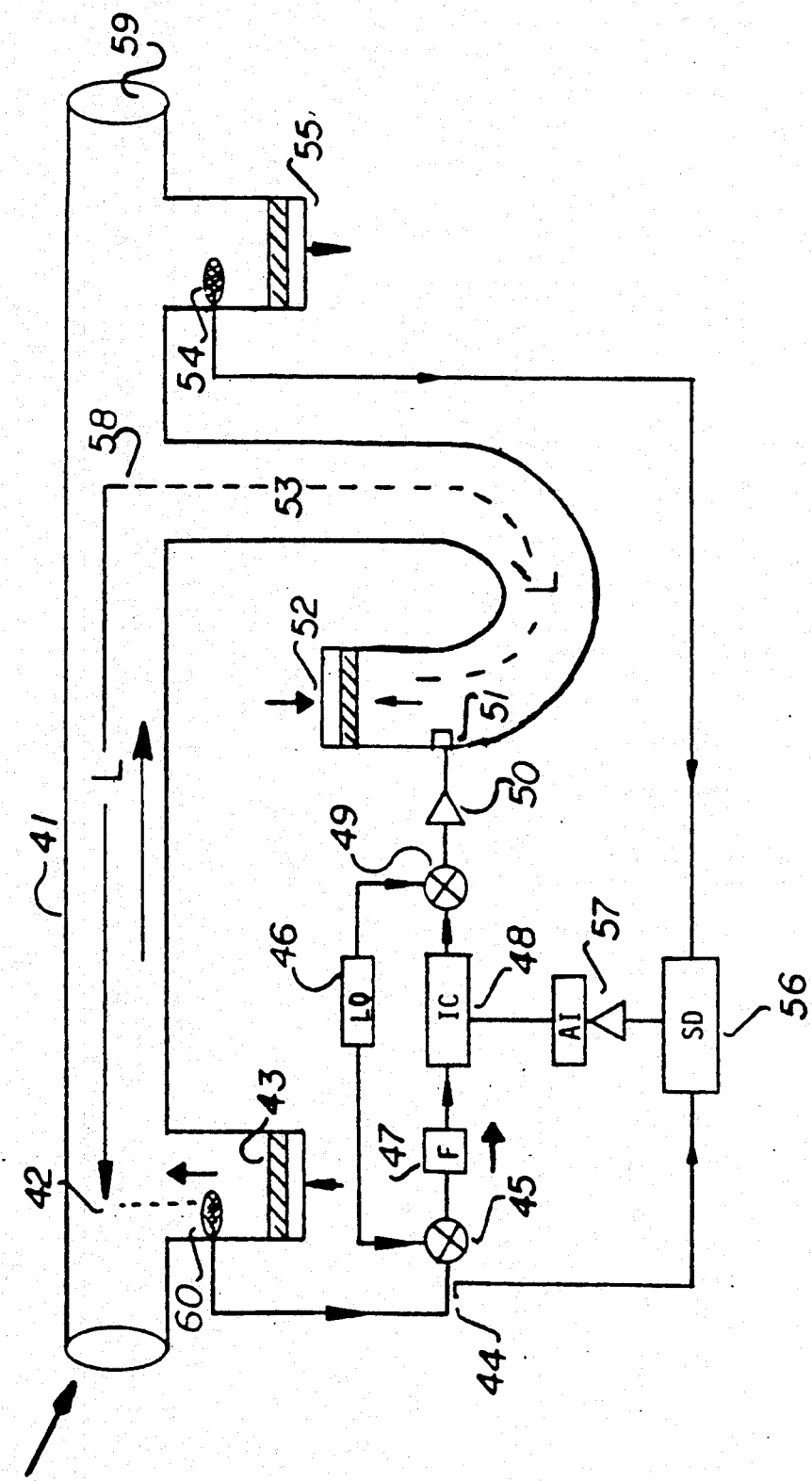
FIG. 4 is a simplified schematic arrangement for interference reduction in an acoustic transmission line or an exhaust pipe of a gasoline or diesel engine. An up and down conversion of the interference at the branch line to accommodate a wide frequency band, as well as the closed-loop control, is shown in the figure.

FIG. 4 illustrates another embodiment of the interference reduction scheme where the mainline does not have a desired signal and the interference at the mainline has to be cancelled or reduced, the interference being an acoustic noise. The function of removing the desired signal from the branch transmission line and the monitoring line, as performed by blocks 3 and 8 in FIG. 1 and 3, are therefore not necessary.

Here 41 denotes an exhaust pipe of a gasoline or Diesel engine that carries an intense acoustic noise, covering a multi-octave of random frequencies, random phases, and random amplitudes. This noise is sampled by a microphone like sensor that converts acoustic noise to corresponding electric signals. These electric signals will be spread over a multi-octave frequency band ranging, for example, less than 100 Hz to several kilohertz, for example. When these signals are mixed at the mixer 45, with a continuous wave signal at a frequency of several megahertz, from the local oscillator 46, the percentage of bandwidth with respect to the center frequency, which corresponds to the local oscillator frequency in this case, will relatively small and will be a fraction of an octave in bandwidth. Such signals are easily controlled in amplitude and phase along with a polarity reversal with commercially available components. The controlled signals at higher frequencies are amplified by the amplifier 50 and then converted into acoustic signals by a transducer 51 similar to a loudspeaker in function. For broadband operation, the line length L in the main transmission line as measured between points 42 and 58, is made the same as L' at the branch line 53, plus the equivalent length due to the time delay introduced by the electric circuit comprised of the sensor 60, mixer 45, 47, interference controller 48, mixer 49, amplifier 50, and the transducer 51. The synchronous detector 56 is referenced to the interference at its original frequency spectrum, as obtained through the coupler 44. The error signal in this case is the residual acoustic noise left at the point 58, inside the exhaust pipe, following the summation of the noise in two lines, at this point. This acoustic noise is sensed by the microphone like sensor 54, which converts the acoustic noise into a corresponding electric signal. When this electric signal is not zero, direct current control signals will be generated by the synchronous detector 56. The control signals flowing through the amplifier-integrator assembly 57 will adjust the amplitude and time or phase delay of the noise at the branchline 53 until the monitored signal at 54 disappears. This will be the equilibrium condition for the closed-loop control. The interference at the output 59 of the main exhaust pipe also disappears or is substantially reduced for the same condition.

The plungers 43, 52 and 55 are provided to match the sensors 51, 54 and 60 respectively so that no appreciable reflections from these sensors enter into the mainline of the exhaust pipe 41.

The above described embodiments and methods are furnished as illustrations of the principles of this invention and are not intended to define the only embodiments possible, in accordance with the teachings of the invention. Rather, protection under the U.S. Patent Law shall be afforded to the inventor not only to the specific embodiments above, but to those falling within the spirit and terms of the invention as defined in the following claims.

I claim:

1. An apparatus for selectively reducing an interference in a transmission line carrying said interference and a desired signal without substantially affecting the desired signal comprising:
   (a) means for sampling said interference almost exclusively from a sampling point at the transmission line such that the sampled signal does not contain any substantial desired signal;
   (b) an interference controller having an input and output port and a control port, capable of adjusting the amplitude and time delay of the sampled interference flowing therethrough from the input port to the output port of said interference controller and reversing the polarity with respect to the input interference, with said input port connected to said sampling point;
   (c) means for introducing the adjusted interference from the output port of the interference controller at a coupling point of said transmission line where the coupling point follows said sampling point with respect to the direction of said desired signal flow, so as to sum, at said coupling point, the interference already existing at the transmission and said adjusted interference;
   (d) means for monitoring almost exclusively said sum of the interferences at a monitoring point of the transmission line that follows said coupling point, said sum of interferences being substantially free of any desired signal;
   (e) means for a closed-loop control to drive said monitored sum of interferences toward a minimum by using said summed interferences from said monitoring point to adjust the amplitude and time delay of the interference through said control port of the interference controller until said adjusted interference becomes equal in amplitude and 180° out-of-phase with respect to the interference already existing at the transmission line at said coupling point.

2. An apparatus for selectively reducing an interference in a transmission line carrying said interference and a desired signal without substantially affecting the desired signal as in claim 1, wherein the transmission line is a waveguide carrying the desired signal and the interference in the form of electromagnetic waves.

3. An apparatus for selectively reducing an interference in a transmission line carrying said interference and a desired signal without substantially affecting the desired signal as in claim 1, wherein the means for sampling the interference comprises a coupler that channels a part of the interference from the transmission line into a branch line that suppresses the desired signal at its output, but passes the interference flowing therethrough to said output.

4. An apparatus for selectively reducing an interference in a transmission line carrying said interference and a desired signal without substantially affecting the desired signal, as in claim 1, wherein the means for introducing the adjusted interference into said transmission line comprises a coupler that combines said adjusted interference at the output of said interference controller and the interference already existing at the transmission line at the coupling point.

5. An apparatus for selectively reducing an interference in a transmission line carrying said interference and a desired signal without substantially affecting the desired signal as in claim 1, wherein the means for monitoring the sum of the interference already existing at the transmission line and the adjusted interference introduced from the output of said interference controller at the coupling point comprises a coupler that channels a part of said summed interference into a device that passes the interference therethrough at its output but attenuates the desired signal at this output.

6. An apparatus for selectively reducing an interference in a transmission line carrying said interference and a desired signal without substantially affecting the desired signal, as in claim 1, wherein the means for closed-loop control for driving said monitored interference sum toward zero comprises:
  (a) a synchronous detector with a reference port, an error port, and an output port, with the error port receiving said monitored interference sum and the reference port receiving said sampled interference from said transmission line, such that there is a direct current signal at said output of the synchronous detector, only as long as there is any interference at said error port, having the same waveform as that of the interference at said reference port; and
  (b) an amplifier-integrator assembly having an input and output port with the input port connected to the output port of said synchronous detector and the output port connected to the control port of said interference controller such that the control signals for this interference controller flows through the amplifier-integrator assembly.

7. An apparatus for selectively reducing the interference in a transmission line carrying said interference and a desired signal without substantially affecting the desired signal, as in claim 1, wherein the transmission line carries acoustic desired signal and interference; each of the means for said sampling and monitoring of interference comprises a microphone that generates an electric signal corresponding to acoustic interference, and the means for introducing the adjusted interference into the transmission line comprises a transducer placed inside said transmission line at a coupling point where the transducer converts the electric signal at the output of the interference controller into corresponding acoustic interference.

8. An apparatus for selectively reducing an interference in a transmission line comprising:
  (a) means for sampling said interference almost exclusively at a sampling point of the transmission line;
  (b) a first heterodyning mixer with a first input port and a second input port and an output port wherein said sampled interference is fed at said first input port;
  (c) a local oscillator, that generates a nearly sinusoidal electrical signal at a frequency substantially higher than that of said interference, connected to said second input port of said mixer;
  (d) an interference controller, having an input and output port and a control port, capable of adjusting the amplitude and time-delay of the output-port-signal of said mixer, and reversing its polarity, the interference controller input port being connected to the output port of said first heterodyning mixer;
  (e) a second heterodyning mixer with a first input port and a second input port and an output port, wherein the first input port is connected to the output port of said interference controller and the second input port is connected to said local oscillator;
  (f) means for introducing the output of said second mixer from the second mixer output port carrying an electric signal corresponding to the sampled interference, except for a change in amplitude and time delay, into said transmission line at a coupling point that follows the sampling point at the transmission line so as to sum the interference, already existing at the transmission line at the coupling point, and the introduced adjusted interference from the output of said second mixer;
  (g) means for almost exclusively monitoring said sum of interference already existing at the transmission line at the coupling point and said introduced, adjusted interference from the output of the second mixer, at a monitoring point of the transmission line that follows the coupling point; and
  (h) means for a closed-loop control to drive the monitored sum of interference toward zero by using this sum interference from said monitoring point to adjust the amplitude and time delay of the interference through said control port of the interference controller until the introduced interference, at the coupling point, becomes equal in amplitude and 180 degrees out-of-phase with respect to the interference already existing at the transmission line at this coupling point.

9. An apparatus for selectively reducing an interference in a transmission line, as in claim 8, wherein the transmission line carries an acoustic interference, each of the means for said sampling and monitoring of interference comprises a microphone that generates an electrical signal corresponding to the acoustic interference and the means for introducing the interference into the transmission line comprises a transducer placed inside the transmission line at the coupling point where the transducer converts the electric signal at the output of the second heterodyning mixer into the corresponding acoustic interference.

10. An apparatus for selectively reducing an interference in a transmission line, as in claim 8, wherein the means for closed-loop control for driving said monitored interference-sum toward zero comprises:
  (a) a synchronous detector with a reference port, an error port and an output port with the error port receiving said monitored interference-sum and the reference port receiving said sampled interference from said transmission line, such that there is a direct current control signal at said output of the synchronous detector only as long as there is any interference at said error port having the same waveform as that of the interference at said reference port; and (b) an amplifier-integrator assembly having an input and output port with the input port connected to the output port of said synchronous detector and the output port connected to the control port of said interference controller, such that the said control signal for the interference controller, flow through the amplifier-integrator assembly.

11. A method for reducing interference in a transmission line carrying a desired signal in combination with said interference without affecting substantially the desired signal, which comprises:
(a) sampling, almost exclusively, said interference from said transmission line wherein such sampled interference containing substantially no desired signal;
(b) controlling the amplitude and time delay of said sampled interference and reversing its polarity;
(c) introducing said controlled interference with polarity reversed into said transmission line so as to sum the interference already existing at the point of introduction of the interference at the transmission line and said introduced interference;
(d) generating control signals in proportion to the summed interference for effecting said amplitude and time delay changes by said interference controller; and
(e) effecting adjustments in amplitude and time delay of said sampled interference by said interference controller through said control signal until said summed interference approaches a minimum.

12. A method for selectively reducing interference in a transmission line which comprises:
(a) sampling, almost exclusively, said interference from said transmission line;
(b) heterodyning said sampled interference with an electrical signal from a local oscillator that generates said electrical signal at a frequency substantially higher than that of the interference;
(c) controlling the amplitude and time delay of said heterodyned interference and reversing its polarity;
(d) synchronously demodulating said adjusted heterodyned interference with reference to the same said local oscillator signal so as to recover the sampled interference, except for a change in amplitude and time delay and a reversal in polarity;
(e) introducing said recovered interference with reversed polarity into said transmission line so as to sum the interference already existing at the point of introduction of the interference at the transmission line and said introduced interference;
(f) generating control signals in proportion to the summed interference for effecting said amplitude and time delay changes by said interference controller; and
(g) effecting adjustments in amplitude and time-delay of said heterodyning interference by said interference controller through said control signals until said summed interference approaches a minimum.

* * * * *